United States Patent [19]

Ota et al.

[11] Patent Number: 5,032,918
[45] Date of Patent: Jul. 16, 1991

[54] ELECTRONIC STILL CAMERA

[75] Inventors: Tadashi Ota; Takao Ikuma, both of Yokohama, Japan

[73] Assignee: Nikon Corporation, Tokyo, Japan.

[21] Appl. No.: 591,977

[22] Filed: Oct. 2, 1990

[30] Foreign Application Priority Data

Oct. 6, 1989 [JP] Japan .................................. 1-259909
Oct. 6, 1989 [JP] Japan .................................. 1-261863

[51] Int. Cl.$^5$ .............................................. H04N 5/30
[52] U.S. Cl. ...................................... 358/209; 358/909
[58] Field of Search .................. 358/209, 909, 906, 335

[56] References Cited

U.S. PATENT DOCUMENTS

| | | | |
|---|---|---|---|
| 4,746,993 | 5/1988 | Tada .................................. | 358/909 |
| 4,754,271 | 6/1988 | Edwards ............................. | 358/909 |
| 4,755,885 | 7/1988 | Okino et al. ........................ | 358/909 |
| 4,764,817 | 8/1988 | Blazek et al. ....................... | 358/909 |
| 4,827,347 | 5/1989 | Bell ..................................... | 358/909 |

Primary Examiner—Stephen Brinich
Attorney, Agent, or Firm—Shapiro and Shapiro

[57] ABSTRACT

An electronic still camera designed to record on a memory card an audio signal in addition to an image signal includes an imaging device for receiving light from an object and outputting an analog image signal, a first A/D conversion means for converting the analog image signal obtained by the imaging device into a digital image signal, a microphone for picking up sound and outputting an analog audio signal, a second A/D conversion means for converting the analog audio signal obtained by the microphone into a digital audio signal, a control means for recording the digital image signal and the digital audio signal onto a memory card which is removably mounted on a camera body, and a semiconductor line memory for storing the digital audio signal.

8 Claims, 10 Drawing Sheets

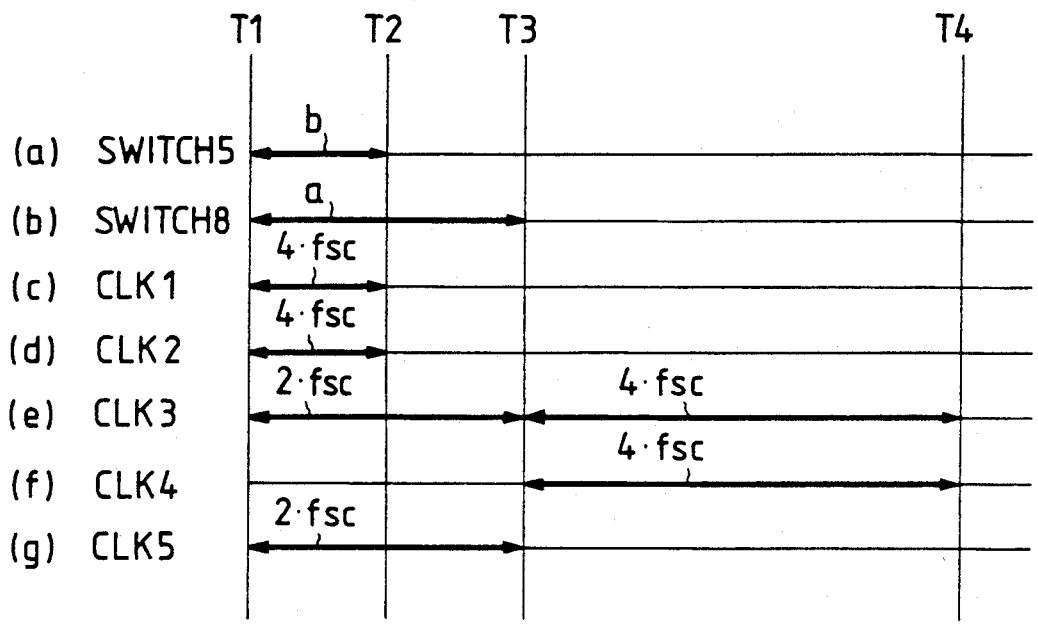
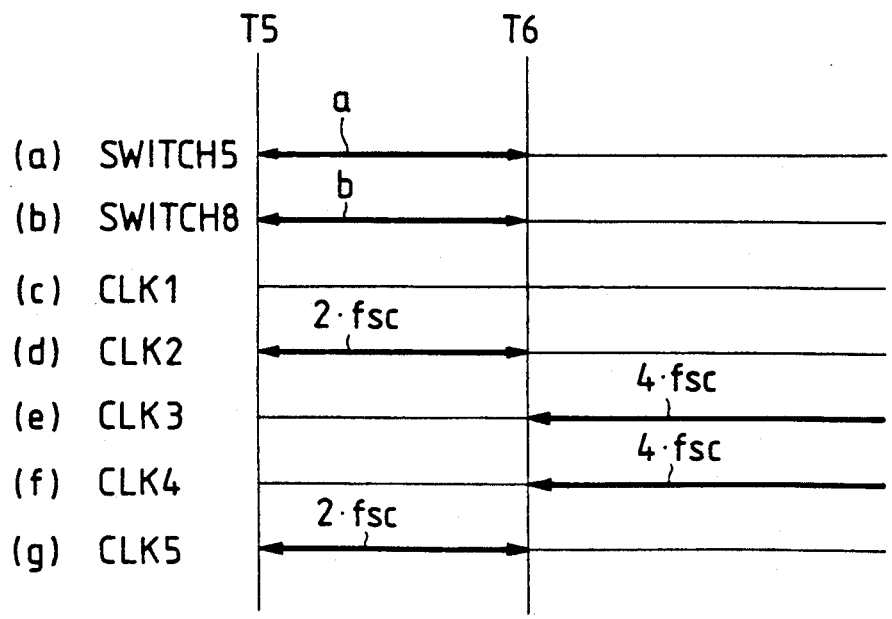

ELECTRONIC STILL CAMERA

BACKGROUND OF THE INVENTION

1. Field of the Invention

The present invention relates to an electronic still camera, and more particularly, to an electronic still camera designed to record on a memory card an audio signal in addition to an image signal.

2. Related Background Art

Electronic still camera systems which employ as a recording medium a floppy disk for recording an image signal and an audio signal are known. In such a system, an audio signal is recorded on a plurality of tracks on the video floppy disk in a compressed form.

To compress the audio signal, an analog audio signal is converted into a digital signal by means of a clock having a frequency of about 10 kHz, and the resultant digital audio signal is then temporarily stored in a large-capacity semiconductor memory. Thereafter, the digital audio signal is read out from the semiconductor memory by means of a clock having a frequency of about 7 MHz and then converted into an analog audio signal again and recorded on the video floppy disk.

In the conventional electronic still camera of the above-described type, since image and sound are recorded on and reproduced from a video floppy disk, a video floppy disk rotation mechanism, a large-capacity semiconductor memory, a D/A converter and so on are required, increasing the overall size, weight, power consumption and production cost of the electronic still camera.

Furthermore, a digital image signal and an analog audio signal must be recorded on separate tracks on a video floppy disk. Consequently, when the image signal and the audio signal are to be recorded on the video floppy disk at the same time, a recording head must be moved relative to the video floppy disk for writing signals on separate tracks. This requires a complicated timing control.

SUMMARY OF THE INVENTION

In view of the aforementioned drawbacks of the conventional electronic still camera, an object of the present invention is to provide an electronic still camera which employs a small-capacity semiconductor line memory to simplify the timing control required for recording an image signal and an audio signal on a memory card.

To this end, the present invention provides an electronic still camera which comprises an imaging device for receiving light from an object and outputting an analog image signal, a first A/D conversion means for converting the analog image signal obtained by the imaging device into a digital image signal, a microphone for picking up sound and outputting an analog audio signal, a second A/D conversion means for converting the analog audio signal obtained by the microphone into a digital audio signal, a control means for recording the digital image signal and the digital audio signal onto a memory card which is removably mounted on a camera body, and a semiconductor line memory for storing the digital audio signal.

When a digital image signal is to be written on the memory card while a digital audio signal is being written on the memory card, the digital audio signal obtained in a period in which the digital image signal is written on the memory card is written in the line memory. After the digital image signal has been written on the memory card, the digital audio signal is read out from the line memory and written on the memory card. It is therefore possible to write on the memory card the digital audio signal obtained in the period in which the digital image signal is written on the memory card without interruption.

Another object of the present invention is to provide an electronic still camera in which a number of remaining frames and a remaining sound recordable time can be checked during the photographing and sound recording operation.

The electronic still camera according to the present invention employs a memory card on which a still picture digital signal obtained by converting an analog signal obtained by an imaging device and an audio digital signal obtained by converting an analog signal obtained by a microphone can be recorded a plurality of times. The memory card is detachably mounted on the electronic still camera.

Hence, the electronic still camera according to the present invention is provided with a display device for displaying a number of photographed frames, a number of remaining frames and a remaining sound recordable time.

The display device may be designed such that it can change over the display between the number of remaining frames and the remaining sound recordable time. In that case, the display device normally displays either of the number of remaining frames or the remaining sound recordable time.

The display device may also be designed such that it can display either of the number of photographed frames, the number of remaining frames or the remaining sound recordable time. In that case, the display device normally displays any combination of these three types of displays. Change in the number of remaining frames, which is conducted by the operation of a dial, changes the remaining sound recordable time.

The display device may also be arranged such that only the remaining sound recording time among the displays made by said display device is separately displayed on the front side of a camera body or at a position where it can be monitored by a person who is photographed.

In the thus-arranged electronic still camera according to the present invention, since the remaining sound recordable time is displayed by the displayed device such as an LCD in addition to the number of remaining frames, the number of remaining frames and the remaining sound recordable time can be checked during the operation. Particularly, when pictures are taken and the sound is recorded at the same site, photographing and sound recording operations can be readily conducted in accordance with the preset number of frames to be photographed and the preset sound recording time.

BRIEF DESCRIPTION OF THE DRAWINGS

FIGS. 2, 3 and 4 are timing charts of the operation of the embodiment of FIG. 1;

DESCRIPTION OF THE PREFERRED EMBODIMENTS

The present invention will now be described in detail with reference to the accompanying drawings.

Figure 1:
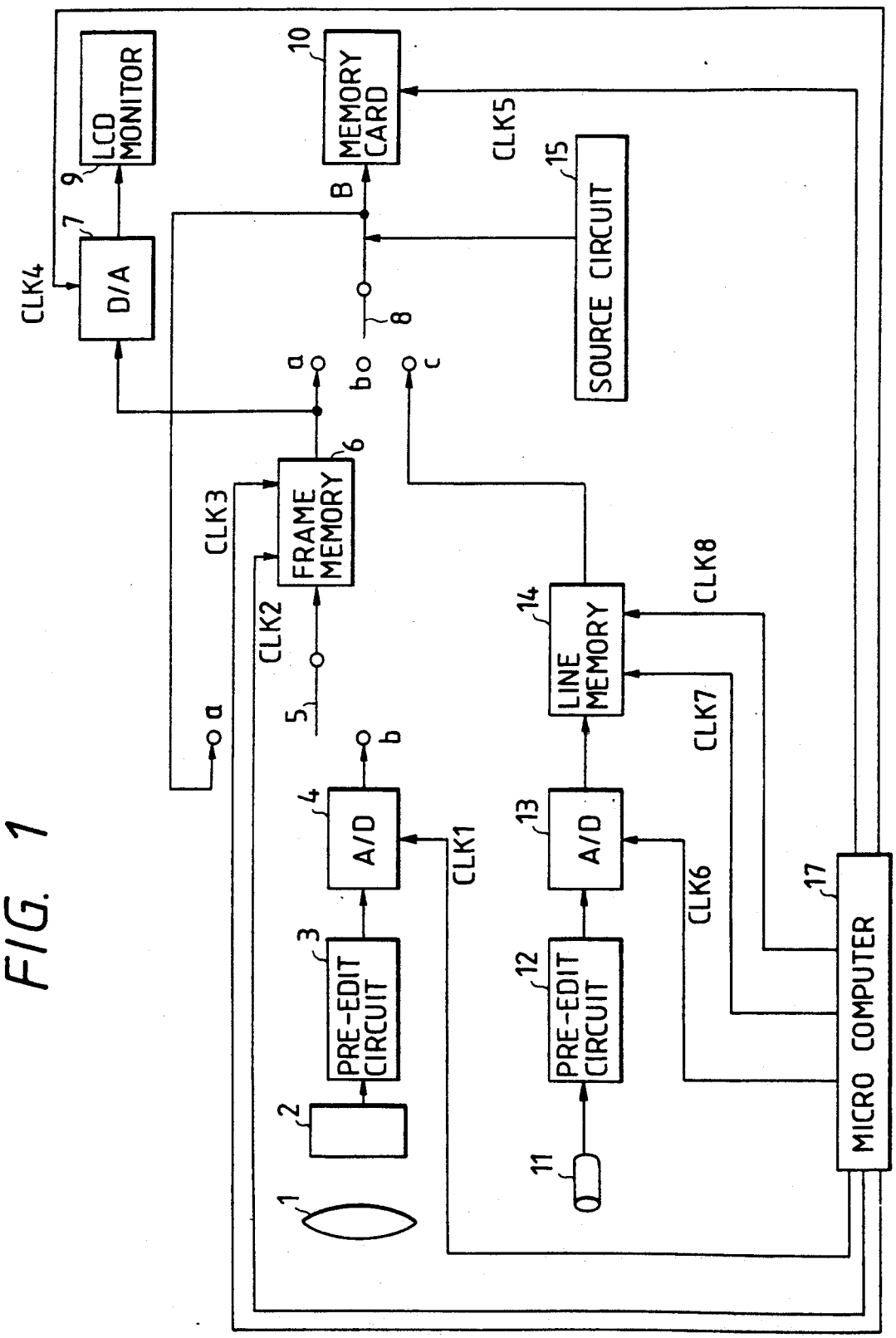
FIG. 1 is a block diagram of a first embodiment of an electronic still camera according to the present invention.

FIG. 1 is a schematic block diagram of a first embodiment of an electronic still camera according to the present invention. In FIG. 1, an electronic still camera includes an image forming lens 1, a CCD imaging device 2, a pre-edit circuit 3 for pre-edit an analog image signal output from the CCD imaging device 2, an A/D converter 4 for converting an analog image signal to a digital image signal, a switch 5 for switching over input of a signal to a frame memory 6, the frame memory 6 which is a dual port type memory having a memory capacity of one frame, a D/A converter 7 connected to the output of the frame memory 6, a switch 8 whose contact "a" is connected to the output of the frame memory 6, an LCD monitor 9 connected to the output of the D/A converter 7, and a memory card 10 connected to the output of the switch 8 through a bus line B. The memory card 10 is removably mounted on the electronic still camera. The output of the switch 8 is also connected to a contact "a" of the switch 5.

The electronic still camera further includes a microphone 11 for picking up sound, a pre-edit circuit 12 for pre-editing an analog audio signal output from the microphone 11, an A/D converter 13 for converting the analog audio signal to a digital audio signal, a line memory for temporarily storing a digital audio signal output from the A/D converter 13, and a source circuit 15 for generating various types of a data such as that on date in accordance with the digital image signal and the digital audio signal which are stored in a memory area of the memory card 10. The output of the line memory 14 is connected to the bus line B which is in turn connected to the memory card 10. The line memory 14 has a capacity corresponding to one line, i.e., a capacity of 1 K bytes, and is of the dual port type in which serial-in and serial-out operations are conducted by the unit of one byte. The output of the line memory 14 is connected to a contact "c" of the switch 8.

The operation of the above electronic still camera will be described below.

It is assumed that the CCD imaging device 2 has 768 pixels in the horizontal direction and 490 pixels in the vertical direction (the nominal pixel number is 380,000) and is driven by a frequency of 4·fsc (fsc: chrominance subcarrier frequency, fsc =3.579545 MHz). The output of the CCD imaging device 2 passes through the pre-edit circuit 3 where gamma correction is conducted on the signal, and the pre-edited signal is then input to the A/D converter 4 driven by a frequency of 4.fsc and having a revolving power of eight bits, and is thereby converted into a digital signal. The output of the A/D converter 4 passes through the switch 5 and is then input to the frame memory 6 through the contact "b" of the switch 5 which is on. The output of the frame memory 6 is sent out by way of two different routes. The output of the frame memory 6 is input to the D/A converter 7, so that an analog image signal converted from the digital image signal can be displayed on the LCD monitor 9. Also, the output of the frame memory 6 passes through the contact "a" of the switch 8 which is on and is then recorded on the memory card 10 which is mounted on the electronic still camera.

Thus, a sequence of operations of recording a digital image signal while checking it on the LCD monitor 9 is completed. When it is desired to simply check the contents of the memory card 10, a digital image signal representing a desired frame is output from the memory card 10 by the operation of a reproduction switch or a recording screen selection switch which are not shown. If the contact "a" of the switch 5 is on, the digital image signal passes through the switch 5 and is then input to the frame memory 6. At that time, if the contact "b" of the switch 8 is on, the digital image signal which is output from the frame memory 6 is supplied to the D/A converter 7 alone, and the analog image signal obtained by the D/A converter is checked by the LCD monitor 9.

When it is desired to record an audio signal, an analog audio signal which has passed through the microphone 11 and the pre-edit circuit 12 is converted into an 8-bit digital audio signal by the A/D converter 13 whose conversion frequency is about 10 kHz. The digital audio signal is input to the line memory 14 in sequence.

The digital audio signal written in the line memory 14 by a writing clock of 10 kHz is read out from the line memory 14 in sequence by a reading out clock of 10 kHz after a time corresponding to one line $(1024/(10\times 10^3) \simeq 0.1$ sec) has elapsed. At that time, if the contact "c" of the switch 8 is on, the audio signal passes through the switch 8 and is then recorded on the memory card 10 as audio information.

Timings in which the above-described sequence of recording operations are conducted will be described in detail with reference to FIGS. 1 to 4.

In FIG. 1, CLK1 denotes the conversion clock for the A/D converter 4; CLK2, the writing clock for the frame memory 6; CLK3, the reading-out clock for the frame memory 6; CLK4, the conversion clock for the D/A converter 7; CLK5, the writing or reading-out clock for the memory card 10; CLK6, the conversion clock for the A/D converter 13; CLK7, the writing clock for the line memory 14; and CLK8, the reading-out clock for the line memory 14. CLK 1 to CLK 8 are output from a microcomputer 17.

Figure 4:
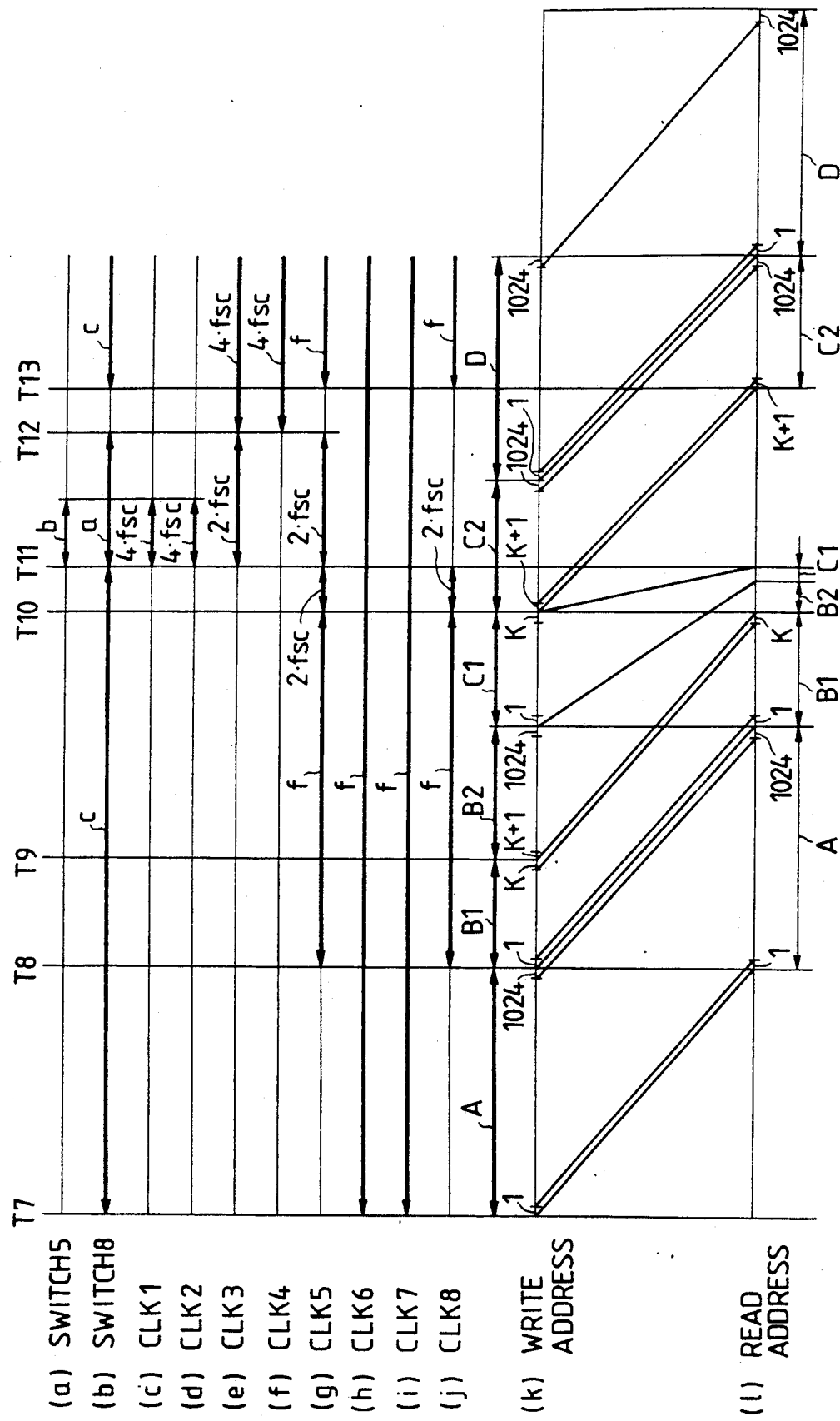

The operations of (1) recording images, (2) checking the contents of the memory card and (3 recording sounds and images simultaneously will be described below successively with reference to FIGS. 2 to 4 which show timings in which the switches 5 and 8 are switched over and in which the frequencies of the respective clock signals are changed. In FIGS. 2 to 4, periods of time regarding CLK1 to CLK8 in which no frequency is affixed means that no clock signal is applied in those periods, and periods of time regarding the switches 5 and 8 in which no contact is affixed means that no contact is connected in those periods.

(1) Image recording

In FIG. 2, (a) and (b) respectively denote the timings in which the switches 5 and 8 are switched over, and (c) to (g) respectively denote the timings in which the frequencies of CLK1 to CLK5 are changed. In FIG. 2, at time T1, when the CCD image device 2 starts outputting an analog image signal by the pressing of a shutter switch (not shown), various processings are started. In this embodiment it is assumed that data is written on the memory card 10 at a maximum speed corresponding to a clock frequency of 2·fsc. First, an analog image signal corresponding to one frame is output from the CCD imaging device 2 in a period of time from T1 to T2. During this period, the A/D converter 4 converts the analog image signal into a digital image signal by the conversion clock CLK1 (frequency: 4–fsc). The resultant digital image signal passes through the contact "b" which is on at that time, and is then recorded in the frame memory by the writing clock CLK2 (frequency: 4-fsc). Reading out of image data from the frame memory 6 by the reading-out clock CLK3 (frequency: 2-fsc) also starts at time T1. When an image is read out from the frame memory 6, the time base is expanded twice. Thus, the image passes through the switch 8 which is switched over to the contact "a", and is then written in the memory card 10 by the writing clock CLK5 (frequency: 2-fsc) over two frame periods. Writing is completed at time T3. Thereafter, checking of the recorded image by the LCD monitor 9 continues till time T4. During the period from time T3 to time T4, a digital image signal read out from the frame memory 6 by the reading-out clock CLK3 of 4-fsc is converted into an analog image signal by the conversion clock for the D/A converter 7 having a frequency of 4-fsc, the analog image signal then being output to the monitor 9.

In this case, since no audio signal is recorded, clock signals CLK6 to 8 are not applied.

Needless to say, while the writing clock CLK5 is applied to the memory card 10, the memory card 10 is in the recording mode.

Subsequent to the recording of the image signal, the data generated by the source circuit 15, e.g., date, photographing No. photographing conditions and so on, is recorded in the data block provided in the memory card 10 in correspondence to the image block in which image signals are recorded.

(2) Checking of the contents of the memory card

In FIG. 3, (a) and (b) respectively denote the timings in which the switches 5 and 8 are switched over, and (c) to (g) respectively denote the timings in which the frequencies of CLK1 to CLK5 are changed over. Assuming that a recording screen selection switch (not shown) provided on the camera body is pressed at time T5 shown in FIG. 3, the operation mode of the memory card 10 is switched over to the reading-out mode accordingly, and the data corresponding to one screen is read out from the memory card 10 by the reading-out clock CLK5 (frequency: 2·fsc) and then written in the frame memory 6 by the writing clock CLK2 (frequency: 2·fsc) through the contact "a" of the switch 5 over two frame periods which last until time T6. At that time, the contact "b" is on in the switch 8 so as to prevent short-circuiting of its outputs. When the writing of the data corresponding to one screen in the frame memory 6 has been completed at time T6, the reading-out clock CLK3 (frequency: 4-fsc) is supplied to the frame memory 6 to read out the digital image signal while the conversion clock CLK4 (frequency: 4·fec) is supplied to the D/A converter 7 to convert the digital image signal to the analog image signal, whereby the image signal is checked by the LCD monitor 9.

In a case where the block on the memory card 10 which is selected by the recording screen selection switch is a block for audio recording, the LCD monitor 9 displays a message indicating that the selected block is a block where an audio signal is recorded. How to determine whether the selected block is one for an image or audio signal will be described later.

In the above-described operation of checking the contents of the memory card 10, since an image or audio signal is not recorded, there is no application of clock signals CLK 1, 6 to 8.

(3) Simultaneous recording of audio and image signals

In FIG. 4, (a) and (b) respectively denote the timings in which the switches 5 and 8 are changed over; (c) to (j), the frequencies of clocks CLK1 to CLK8; and (k) and (l), writing address and reading-out address of the line memory 14. The case shown in FIG. 4 is one in which image recording is instructed at a given time while the audio signal is being recorded. The still camera is provided with the 1-Kbyte line memory 14 for audio recording. A digital audio signal is written in the line memory 14 in sequence by the fixed clock CLK7 (frequency: 10 kHz). The digital audio signal is read out from the line memory 14 and recorded on the memory card 10 in sequence a time substantially corresponding to one line $(1024/10 \times 10^3) \simeq 0.1$ sec) after writing of data in the line memory 14 has started. When the shutter switch (not shown) is pressed, the digital audio signal corresponding to one line is first read out from the line memory 14 at a high speed by the clock CLK8 (frequency: 2-fsc), and then the digital image signal is recorded on the memory card 10 in the remaining time.

In FIG. 4, it is assumed that sound recording is started at time T7 by the pressing of a sound recording starting switch (not shown) of an electronic still camera. It is also assumed that a shutter switch (not shown) for sound recording is pressed at time T9, and that reading-out of an analog image signal from the CCD imaging device 2 starts at time T11.

At time T7, when sound recording starting switch is pressed, the A/D converter 13 starts converting the analog audio signal into a digital audio signal by the conversion clock CLK6 (frequency f: 10 kHz), and concurrently with this the line memory 14 starts writing the digital audio signal by the writing clock CLK7 (frequency: f). After the writing address of the line memory 14 has reached the maximum address of 1K, i.e., 1024, that is, from time T8 and onward, the reading-out clock CLK8 (frequency: f) is supplied to the line memory 14 to read out the digital audio signal. The digital audio signal passes through the contact "c" of the switch 8 and is then recorded on the memory card 10.

From time T8 and onward, the writing block CLK5 (frequency: f) is applied to the memory card 10. Next, the frequency of the reading-out clock CLK8 for the line memory 14 is changed from f to 2·fsc at time T10. As a result, the digital audio signal to be readout from the line memory 14 in a period from T9 to T10, corresponding to one line, i.e., in a period B2 corresponding to the writing address from k+1 to 1024 and in a period C1 corresponding to the writing address from 1 to k in (k) and (1) in FIG. 4, is written on the memory card 10 in such a short period of time as 143 μsec (1024/(21·fsc)). At that time, the frequency of the writing clock CLK5 for the memory card 10 is also changed over from f to 2·fsc.

At time T11 writing of the digital audio signal corresponding to periods B2 and C1 on the memory card 10 is completed. So, from time T11 and onward, the digital image signal is writing on the memory card 10 over the two frame periods by the same procedures as those for the case of (1) image recording.

While the image recording is conducted, the digital audio signal is written in the line memory 14 in sequence. The remaining digital audio signal (from period C2 corresponding to the line memory address from k+1 to 1024 and onward) is read out from the line memory 14 from time T13 and onward by the reading-out clock CLK8 (frequency: f). Time T13 is a time corresponding to one line later from time T10. The digital audio signal read out from the line memory 14 is written on the memory card 10 by the writing clock CLK5 (frequency: f).

As stated above, when an instruction of writing a digital image signal on the memory card 10 is given by pressing the shutter for image recording while the digital audio signal is being written on the memory card 10, the digital audio signal present in the line memory 14 at that time, corresponding to one line, is written on the memory card 10 at a higher speed by the writing clock. The moment writing of the digital audio signal corresponding to one line has been completed, writing of the digital image signal on the memory card 10 is started. Since the digital audio signal is kept written in the line memory 14 while the digital image signal is being written on the memory card 10, recording of the audio signal is not interrupted. That is, the storage capacity of the line memory 14 is large enough to store a digital audio signal obtained in a period in which the digital image signal is written on the memory card 10.

In order to store a digital audio signal and a digital image signal effectively on the memory card 10 in a mixed state, the storage area of the memory card 10 is divided into a plurality of blocks each of which stores a signal corresponding to one field. Consequently, the digital image signal and the digital audio signal are recorded on the memory card 10 in separate blocks. The block in which the digital image signal is stored is called an image block, while the block for the audio signal is an audio block.

In each of the image or audio blocks, the following data generated from the source circuit 15 will be recorded together with the image or audio signal.

(1) Identification data which indicates the type of data recorded in that block, i.e., an audio signal or an image signal.

(2) Data which indicates that sound is recorded in blocks in sequence.

(3) In the case of simultaneous recording of image and sound, audio block No. corresponding to that image block and image block No. corresponding to that audio block.

Figure 5:
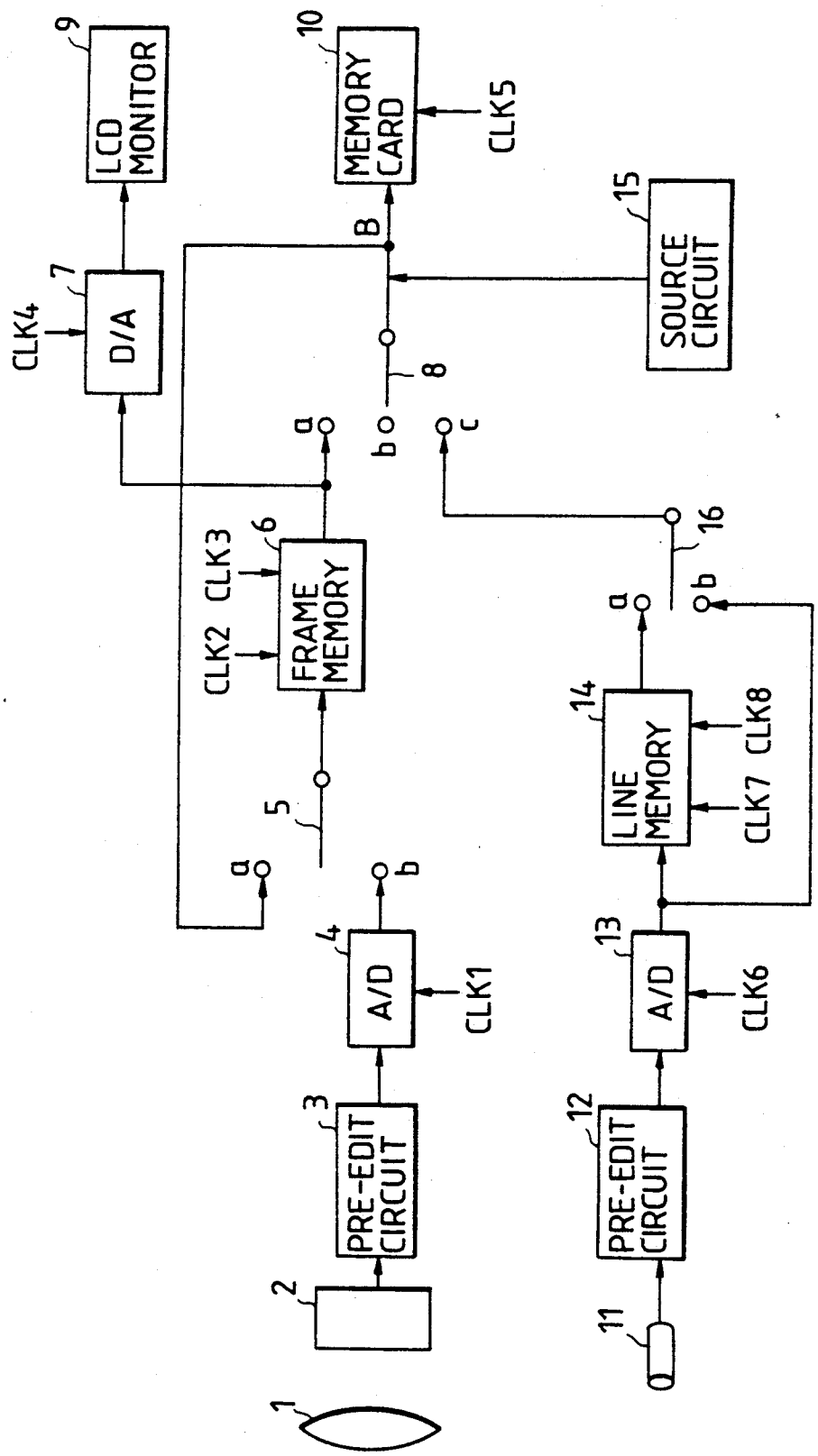
FIG. 5 is a block diagram of a second embodiment of the present invention.
Figure 6:
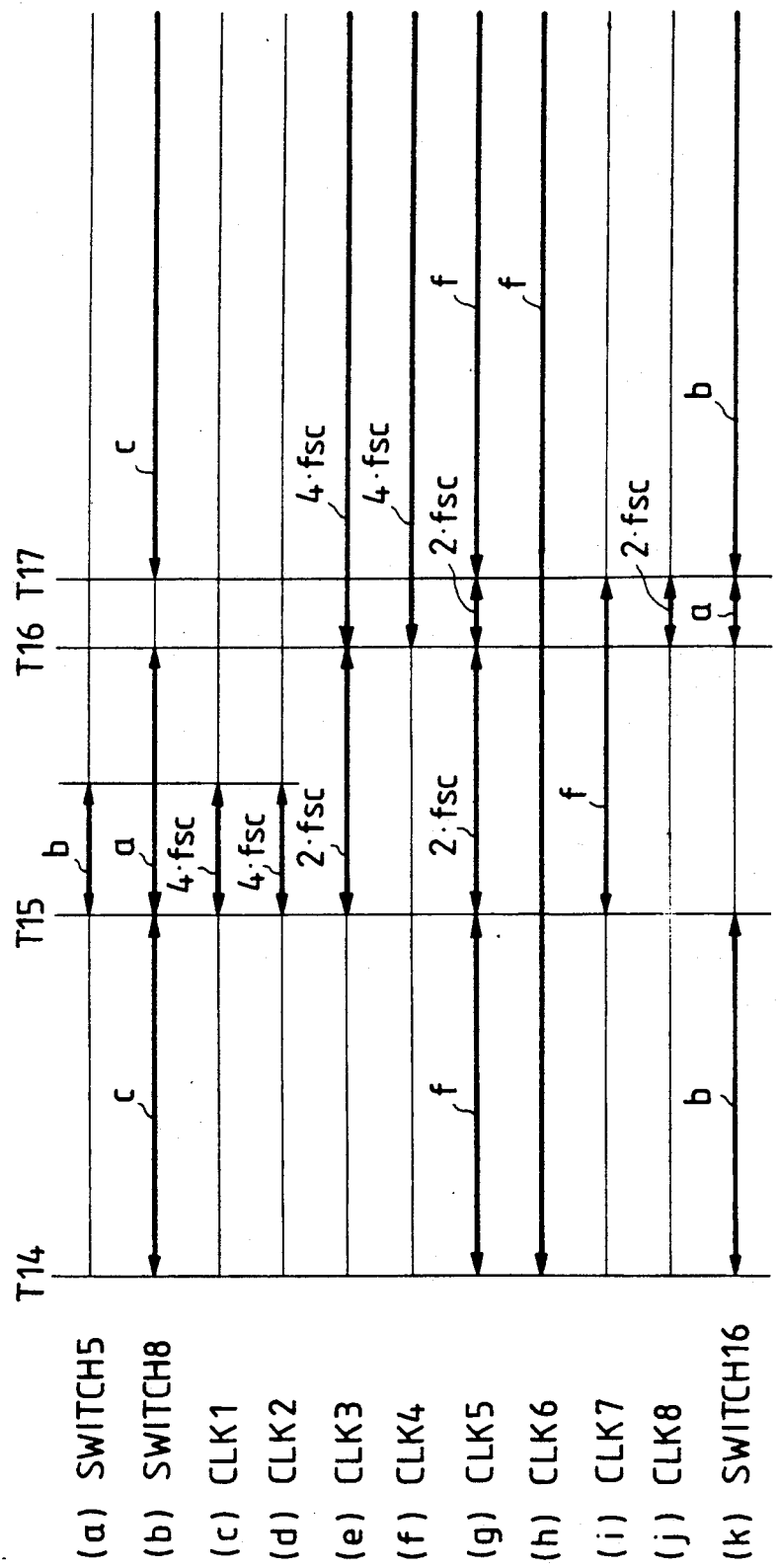
FIG. 6 is a timing chart of the operation of the embodiment of FIG. 5.

A second embodiment of the present invention will be described below with reference to FIGS. 5 and 6. FIG. 5 is a block diagram of the second embodiment in which the same reference numerals are used to denote parts which are the same as those in FIG. 1. FIG. 6 is a timing chart of the embodiment shown in FIG. 5 wherein the same reference symbols are used to denote frequencies and switches which are the same as those in FIGS. 2 and 3.

The embodiment shown in FIG. 5 differs from that shown in FIG. 1 in that a switch 16 is provided. In the second embodiment, a digital audio signal is normally recorded on the memory card 10 on a real-time basis through a contact "b" of the switch 16. However, when a shutter switch (not shown) is pressed, the digital image signal is written on the memory card 10 while the digital audio signal is written in the line memory 14. Once recording of the digital image signal has been completed, the switch 16 is changed over from contact "b" to contact "a", and the digital audio signal stored in the line memory 14 is thereby read out by the highspeed block signal and written on the memory card 10. The switch 16 is returned from contact "a" to contact "b" the moment writing of data corresponding to one line has been completed, and the digital audio signal is thereafter written on the memory card 10 on a real-time basis.

The operation of the still camera shown in FIG. 5 will be described below with reference to FIG. 6. In FIG. 6, (a) to (j) denote the timings in which the switches 6 and 8 are changed over and in which the frequencies of CLK1 to CLK8 are changed, like (a) to (j) in FIG. 4. (k) denotes the timings in which the switch 16 is changed over. As is apparent from FIG. 6, the switches 5 and 8 and the clocks CLK1 to CLK4 are operated in the same manner as that shown in FIG. 4.

First, the sound recording starting switch (not shown) is pressed at time T14, and the A/D converter 13 starts converting an analog audio signal into a digital audio signal by means of the conversion clock CLK6 (frequency: f). The resultant digital audio signal passes through the contact "b" of the switch 16 which is on at that time, and is then written on the memory card 10 on a real-time basis by means of the writing clock CLK5 (frequency: f). Thereafter, the shutter switch (not shown) is pressed at time T15, whereby the CCD imaging device 2 starts reading out an analog image signal. In this embodiment, writing of the image signal onto the memory card 10 ends at time T16 which is two frame periods later from time T15.

At time T15, when reading-out of the image signal from the CCD imaging device 2 started, the line memory 14 starts writing a digital audio signal by means of the writing clock CLK7 (frequency: f). Writing of the digital audio signal in the line memory 14 continues until time T17 when the data is written on the Nth address in the line memory 14. The line memory 14 starts reading out the digital audio signal by means of the reading-out clock CLK8 (frequency: 2·fsc) at time T16 which is two frame periods later from the time T15, i.e., when writing of the digital image signal on the memory card 10 has been completed. The digital audio signal read out from the line memory 14 passes through the contact "a" of the switch 16 and is written on the memory card 10 by the writing clock CLK5 (frequency: 2·fsc). This continues until the time T17, i.e., until when reading-out of the Nth address is completed.

Hence, the two periods of time, which begin at time T15, when reading-out of an image signal from the CCD imaging device 2 starts, and ends at time T17, when writing of data on the Nth address in the line memory ends and reading-out of data from that ends, are equal.

(1) The period of time in which data is written in the line memory 14 at N addresses thereof by the clock CLK7 (frequency: f = 10 kHz)

(2) The sum of the period of time corresponding to two frames (2/30 sec) and the period of time in which the data is read out from the line memory 14 from N addresses thereof by the clock CLK 8 (frequency: 2·fsc = 2·3.58 MHz).

From the above-described relation, the writing address and the reading-out address of the line memory 14 coincide with each other at time T17 when the address N of the line memory 14 is 667. Therefore, the switch 16 is changed over from contact "a" to contact "b" at this time, and a digital audio signal is thereby written on the memory card 10 on a real-time basis afterwards.

In an electronic still camera designed such that the memory card can be operated at a frequency of 4·fsc which is the driving frequency of the CCD imaging device, it is possible to omit the frame memory. This allows the size of the camera body and power consumption thereof to be greatly reduced.

A digital image signal or a digital audio signal may be compressed using the compression technique such as the orthogonal transform. In that case, the storage capacity of the memory can be greatly reduced, and the number of frames and the audio signal which can be recorded on the memory card can also be greatly increased.

As will be understood from the foregoing description, in the electronic still camera according to the present invention, when a digital image signal is to be written on the memory card while a digital audio signal is being written on the memory card, the digital audio signal obtained in a period in which the digital image signal is written on the memory card is written in the line memory. After the digital image signal has been written on the memory card, the digital audio signal is read out from the line memory and written on the memory card. It is therefore possible to write on the memory card the digital audio signal obtained in the period in which the digital image signal is written on the memory card without interruption.

Since the digital image signal and the digital audio signal are recorded on the memory card in the manner described above, a semiconductor memory having a large storage capacity required for audio compression or a D/A converter are eliminated, unlike the conventional still camera. This is effective in reduction in the size of the camera body and in the power consumption.

Furthermore, since no video floppy disk is employed in the still camera of the present invention, control of complicated timings required to move a recording head is not necessary.

In the electronic still camera of the above-described type in which a still picture signal and an audio signal are recorded on a memory card, in particular, of the type in which pictures are taken while sound is being recorded, it may occur that the memory is occupied by the sounds and hence there is no capacity of the memory left for pictures.

Hence, the following embodiment of an electronic still camera according to the present invention involves display of a number of remaining frames and a remaining sound recordable time, which is made when the pictures are taken while the sound is being recorded by the camera.

Figure 7:
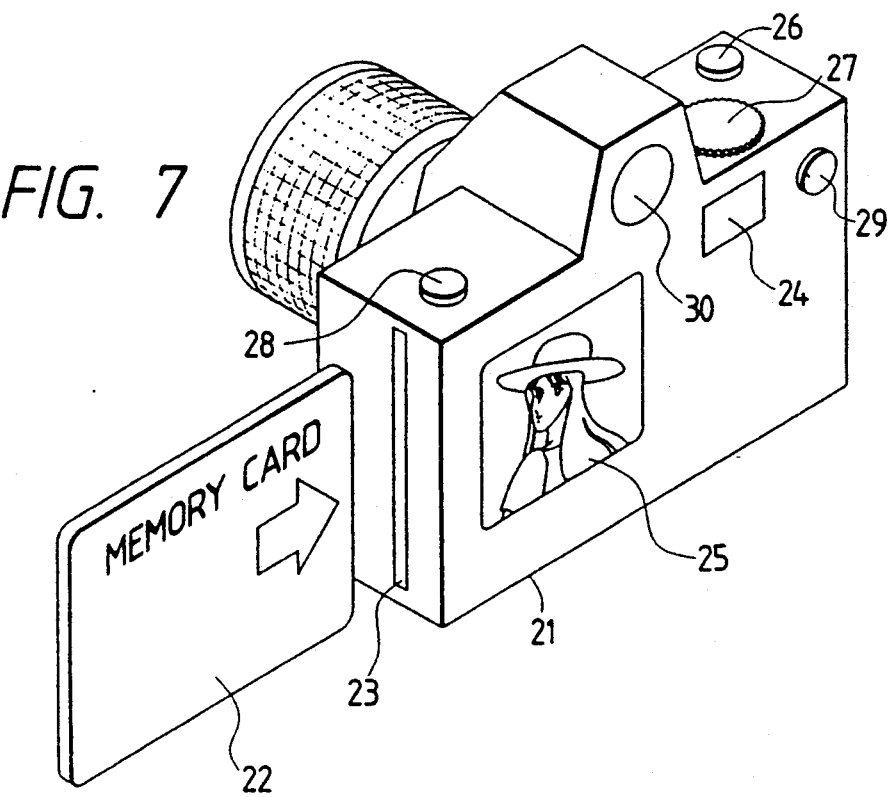
FIG. 7 is an external view of an electronic still camera, showing a third embodiment of the present invention.

FIG. 7 shows an external view of a third embodiment of the electronic still camera according to the present invention.

In FIG. 7, an electronic still camera body 21 has an opening 23. A memory card 22, which is a recording medium on which image data is recorded, can be inserted into the opening 23 and thereby connected to the still camera body 21. The memory card 22 has a storage capacity with which image data representing a plurality of frames can be recorded and with which sound can be recorded for a few minutes. The image data and the sound data can also be recorded on the memory card in a mixed state. A display device 24 displays frame No. or a number of remaining frames, as well as the remaining sound recordable time. The contents of the memory card 22 are displayed by a liquid crystal display 25. The liquid crystal display 25 is also used as a view finder. A setting dial 27 is normally used to set the shutter speed or stop. The contents of the display (the frame to be displayed) by the liquid crystal display 25 can be changed over by turning the setting dial 27 while a selection button 28 is being pressed. Sound recording begins by the pressing of a sound recording button 29. The camera has an optical finder 30.

Frame No. or the number of remaining frames and the remaining sound recordable time may not be displayed on the display device 24 but be displayed on the liquid crystal display 25 over an image.

Furthermore, the liquid crystal display 25 may be arranged such that it normally displays the designated contents of the memory card 22 and such that it is changed over to a view finder by pressing a release button 26 half way.

Figure 8:
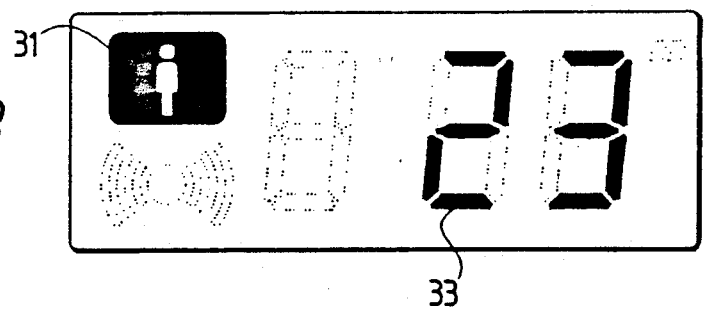
FIGS. 8 and 9 show examples of a display device incorporated in the camera of FIG. 7.
Figure 9:
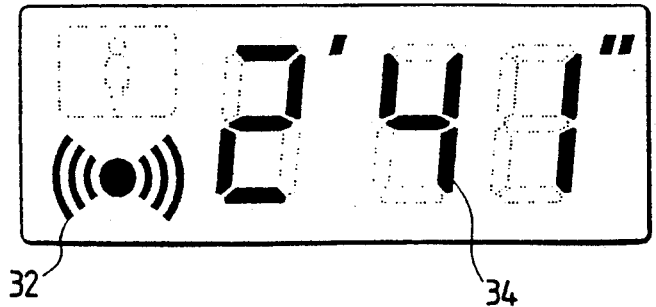

FIGS. 8 and 9 show examples of display made by the display device 24 shown in FIG. 7.

In FIGS. 8 and 9, a reference numeral 31 denotes a symbol mark which indicates that the display device is displaying the number of remaining frames or frame No.; 32, a symbol mark which indicates that the display device is displaying the remaining sound recordable time; 33, the liquid crystal display of the number of remaining frames or that of frame No.. Normally, the display device 24 displays the number of remaining frames or frame No., as shown in FIG. 8. However, during the sound recording which is started by the pressing of the sound recording button 29, the display device 24 displays a remaining sound recordable time 34, as shown in FIG. 9. When it is desired to take pictures during the sound recording, the release button 26 is pressed half way to make the display device 24 display the number of remaining frames shown in FIG. 8. To make the display device 24 display the display shown in FIG. 9, the release button may be pressed to the full or the pressing of the release button may be released. At that time, the remaining sound recordable time has decreased by a value corresponding to the number of photographed frames.

It may also be arranged such that the display device 24 normally displays frame No., such that it displays the number of remaining frames while the release button is being pressed half way, and such that it displays the remaining sound recordable time during the sound recording which is started by the pressing of the sound recording button. In that case, the display device 24 displays the number of remaining frames when the release button is pressed half way during the sound recording.

Figure 10:
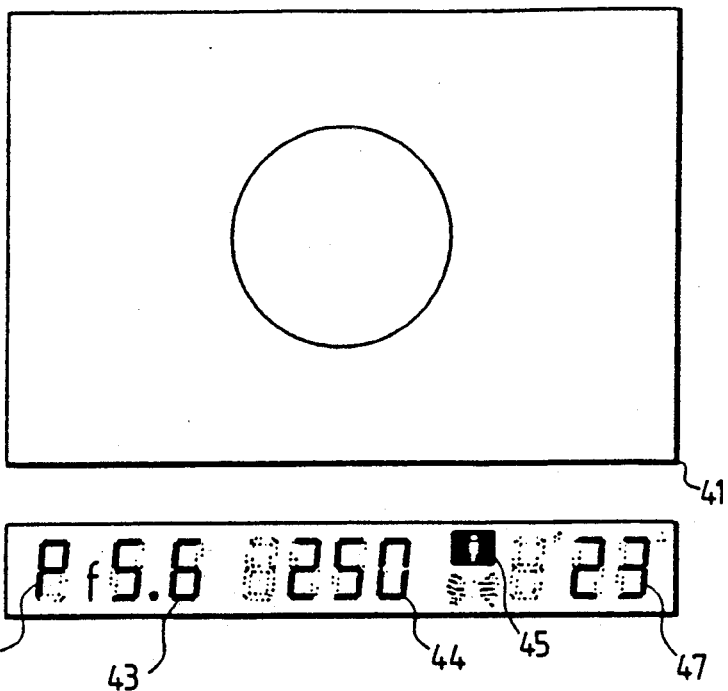
FIGS. 10 and 11 show modifications of the display device which is provided in a finder.
Figure 11:
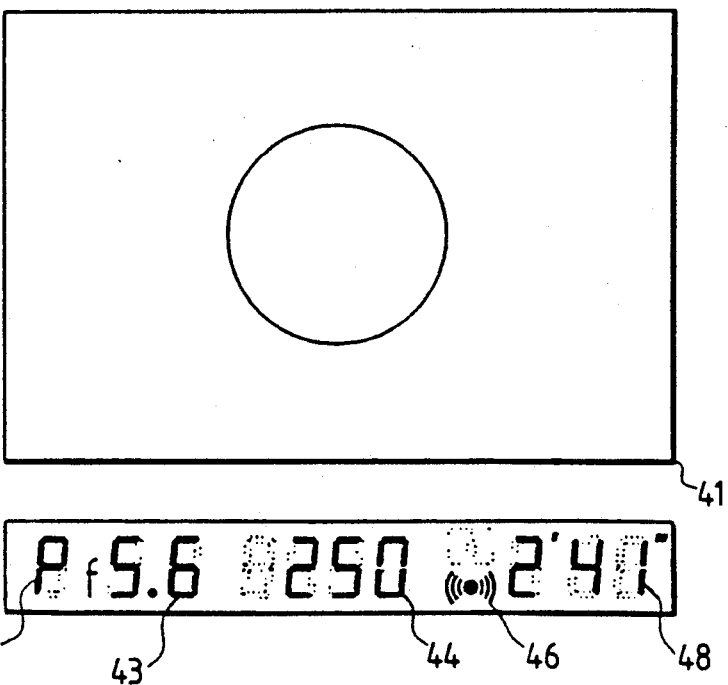

FIGS. 10 and 11 show examples of display made by the display device 24 on the finder shown in FIG. 7. This display device 24 displays, together with other displays, the number of remaining frames or frame No. and the remaining sound recordable time.

In FIGS. 10 and 11, a reference numeral 41 denotes a visual field frame; 42, an operation mode; 43; a stop; 44, a shutter speed; 45, a symbol mark indicating that the display device is displaying the number of remaining frames or frame No.; 46, a symbol mark indicating that the remaining sound recordable time is displayed; and 47, a liquid crystal display of the number of remaining frames or that of frame No.. Normally, the display device 24 displays the number of remaining frames or frame No., as shown in FIG. 10. However, the display device 24 displays the remaining sound recordable time, as shown in FIG. 11, during the sound recording which is started by the pressing of the sound recording button 29. When it is desired to take pictures during the sound recording, the release button 26 is pressed half way to make the display device display the number of remaining frames, as shown in FIG. 10. To make the display device 24 display the remaining sound recordable time, the release button may be pressed to the full or pressing of the release button is released.

Figure 12:
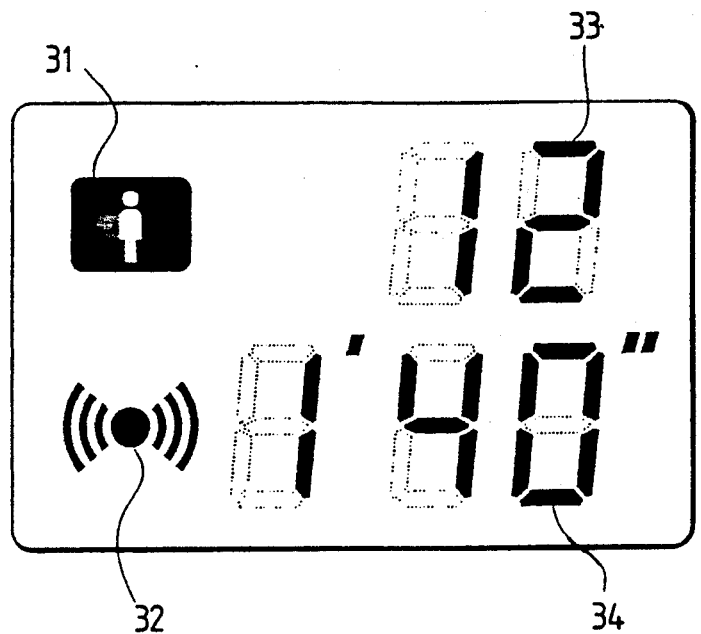
FIG. 12 shows a modification of the display device.

FIG. 12 shows another example of the display made by the display device 24 shown in FIG. 7.

In FIG. 12, a reference numeral 31 denotes a symbol mark indicating that the display made by the seven-segment display devices 33 and 34 is respectively a number of remaining frames and a number of photographed frames, and 32 denotes a symbol mark indicating that the display made by the display device 34 is the remaining sound recordable time.

That is, lighting of both the symbol marks 31 and 32 indicates that the display device 33 is displaying the number of remaining frames while the display device 34 is displaying the remaining sound recordable time. Lighting of the symbol mark 31 along indicates that the display device 33 is displaying the number of remaining frames while the display device 34 is displaying the number of photographed frames. At that time, the lowest two digits of the display, which would be used to display "second" when the remaining time is displayed by the display device 34, displays the number of photographed frames, and the digit for "minute" displays, for example, a small letter, "r", which is an abbreviation of "recorded."

In the example of display shown in FIG. 12, the number of remaining frames and the remaining sound recordable time are displayed at the same time. In a case where the number of frames to be photographed and the sound recording time are preset in the program mode before actual photographing and sound recording are started, the sum of the memory capacity corresponding to the number displayed by the display device 33 and the memory capacity corresponding to the time displayed by the display device 34 is the total amount of remaining memory capacity. The ratio of the number of frames to be photographed and the sound recording time may be readily changed by rotating, for example, the setting dial 29 shown in FIG. 7 in the program mode. Such a program mode is convenient to make a plan on the number of photographs to be taken and the sound recording time during, for example, a concert.

In a normal photographing and sound recording operation in which the number of frames and the sound recording time are not programmed, it is also possible to make the display device 34 display 0 or nothing during the photographing and to make the display device 33 display 0 or nothing during the sound recording.

Figure 13:
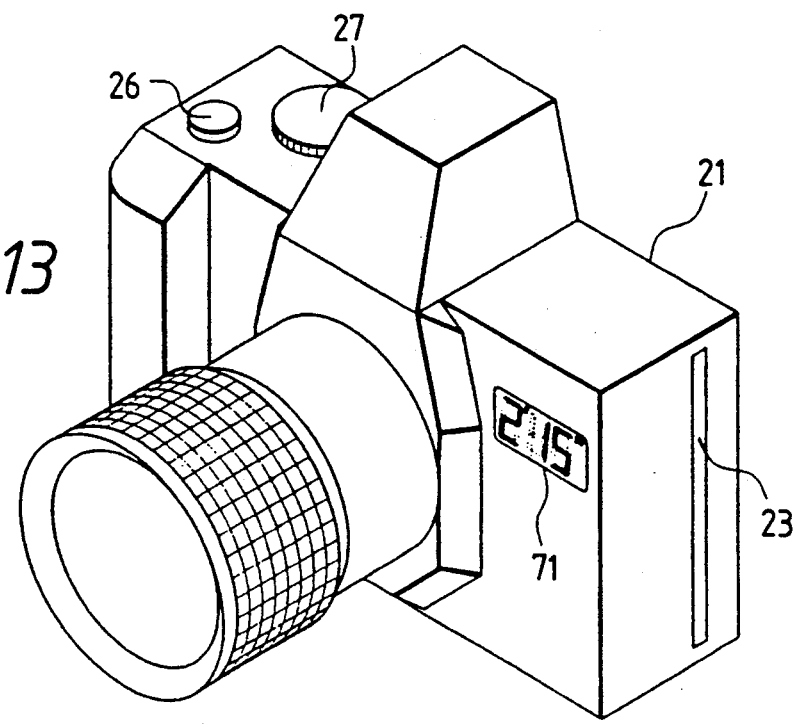
FIG. 13 is an external view of the electronic still camera, showing a fourth embodiment of the present invention.

FIG. 13 shows an external view of an electronic still camera in which the sound recordable time, displayed by the display device 24 shown in FIG. 7, is also displayed on the front surface of the camera body so that it can be monitored by a person who is photographed.

In FIG. 13, a reference numeral 71 denotes a display device which displays the remaining sound recordable time in such a way that it can be readily monitored by a person who is photographed. In the example shown in FIG. 13, the remaining time is displayed in a digital fashion. Up to 9 minutes 59 seconds can be displayed by the display device 71.

Figure 14:
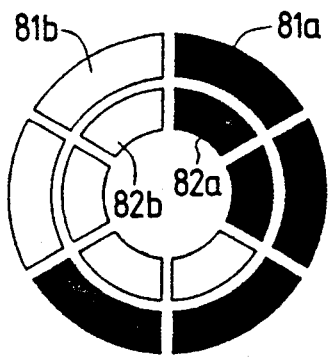
FIGS. 14 and 15 show modifications of the display device shown in FIG. 13.
Figure 15:
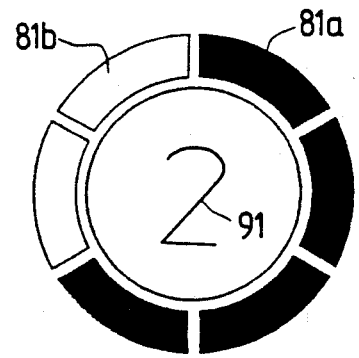

FIGS. 14 and 15 show modifications of the display device 71 shown in FIG. 13.

In FIG. 14, LEDs 81a and 81b located on the outer periphery display second, and LEDs 82a and 82b located on the inner periphery display minute.

In FIG. 15, a digital liquid crystal display 91 displays minute. In FIGS. 14 and 15, the LEDs 81a and 82a are those which are emitting light, and LEDs 81b and 82b are those which are not emitting light. The sum of the LEDs which are emitting light is the remaining time. In these modifications, the LEDs 81a and 81b each indicate ten seconds, and the LEDs 82a and 82b each indicate one minute. That is, in both examples shown in FIGS. 14 and 15, about 2 minutes forty seconds is indicated as the remaining sound recordable time. The number of LEDs 81a or that of LEDs 82a decreases as the time elapses. To match the clock used in the practical life, the LEDs which are emitting light are made to extinguish one by one counterclockwise. Furthermore, it may also be arranged such that the LEDs 81a and 82a blink for a little while before they extinguish as the sound recording time decreases.

The examples shown in FIGS. 14 and 15 employ LEDs. However, another display member, such as liquid crystal display or EL, may also be used.

Figure 16:
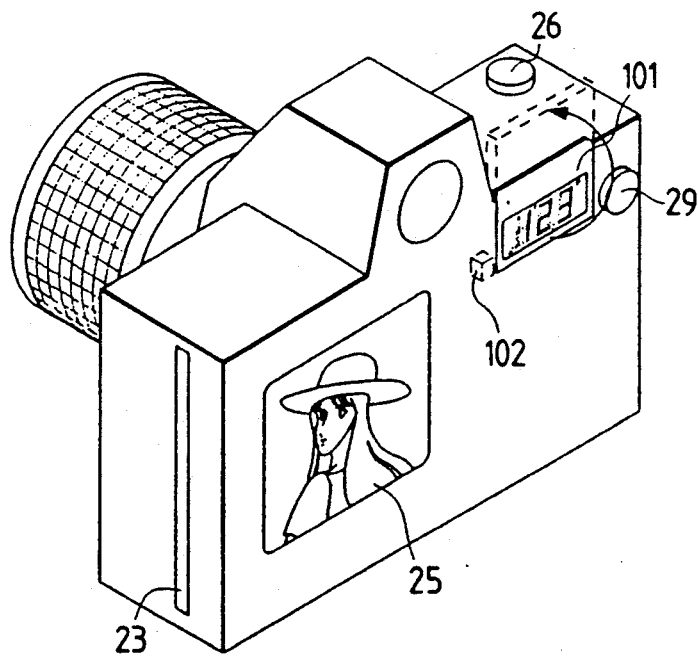
FIG. 16 is an external view of the electronic still camera, showing a fifth embodiment of the present invention.

FIG. 16 shows an external view of an electronic still camera with a display device which serves as the display device 24 shown in FIG. 7 and as the display device 71 shown in FIG. 13.

In FIG. 16, a display device 101 displays the number of remaining frames and the remaining sound recordable time. The position of the display device 101 is detected by a switch 102. The display device 101 is made rotatable, as shown by an arrow in FIG. 16, so as to allow it to be monitored from the front side of the electronic still camera also.

Figure 17:
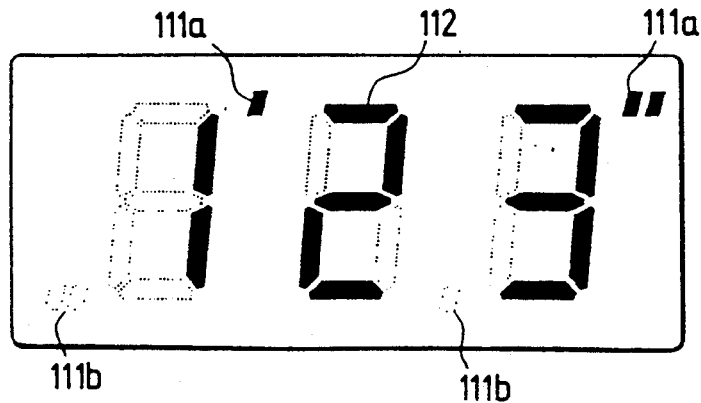
FIG. 17 shows a modification of the display device of FIG. 16.

FIG. 17 shows an example of the display made of the display device 101 shown in FIG. 16. Reference numerals 111a denote symbols for minute and second. When the display device 101 is located at a position shown by the broken line in FIG. 16, the display made by the device 16 is up side down and reversed. Hence, when it is determined that the display device 101 is not at its predetermined position, a digital display 112 made by the display device 101 is turned up side down, and symbols 111b are used in place of the symbols 111a to indicate minute and second.

Figure 18:
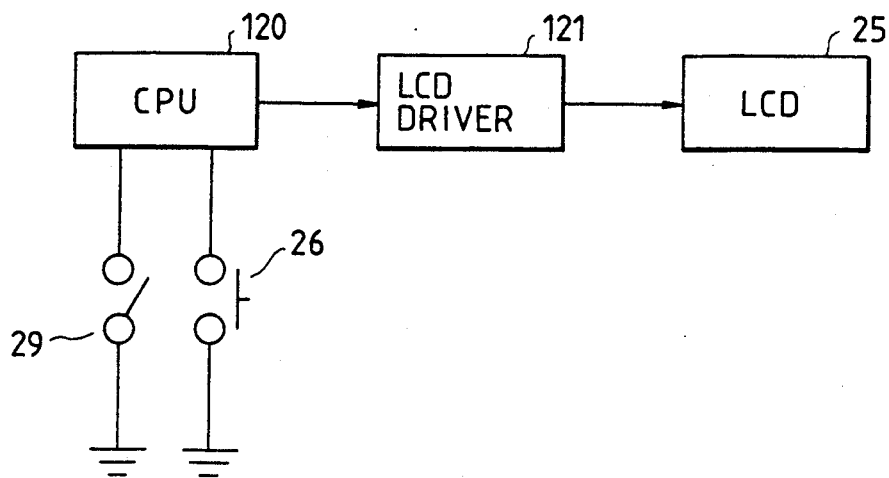
FIG. 18 is a block diagram of the third to fifth embodiments of the present invention.

FIG. 18 is a block diagram of an electronic still camera in which the number of remaining frames and the remaining sound recordable time can be checked during the photographing and sound recording operation.

In FIG. 18, a CPU 120 is connected to the sound recording button 29 and to the release button 26. Also, the CPU 120 outputs to a LCD driver 121 a signal to display on a liquid crystal display device (LCD) 25 a number of remaining frames, a number of photographed frames or a remaining sound recordable time.

Figure 19:
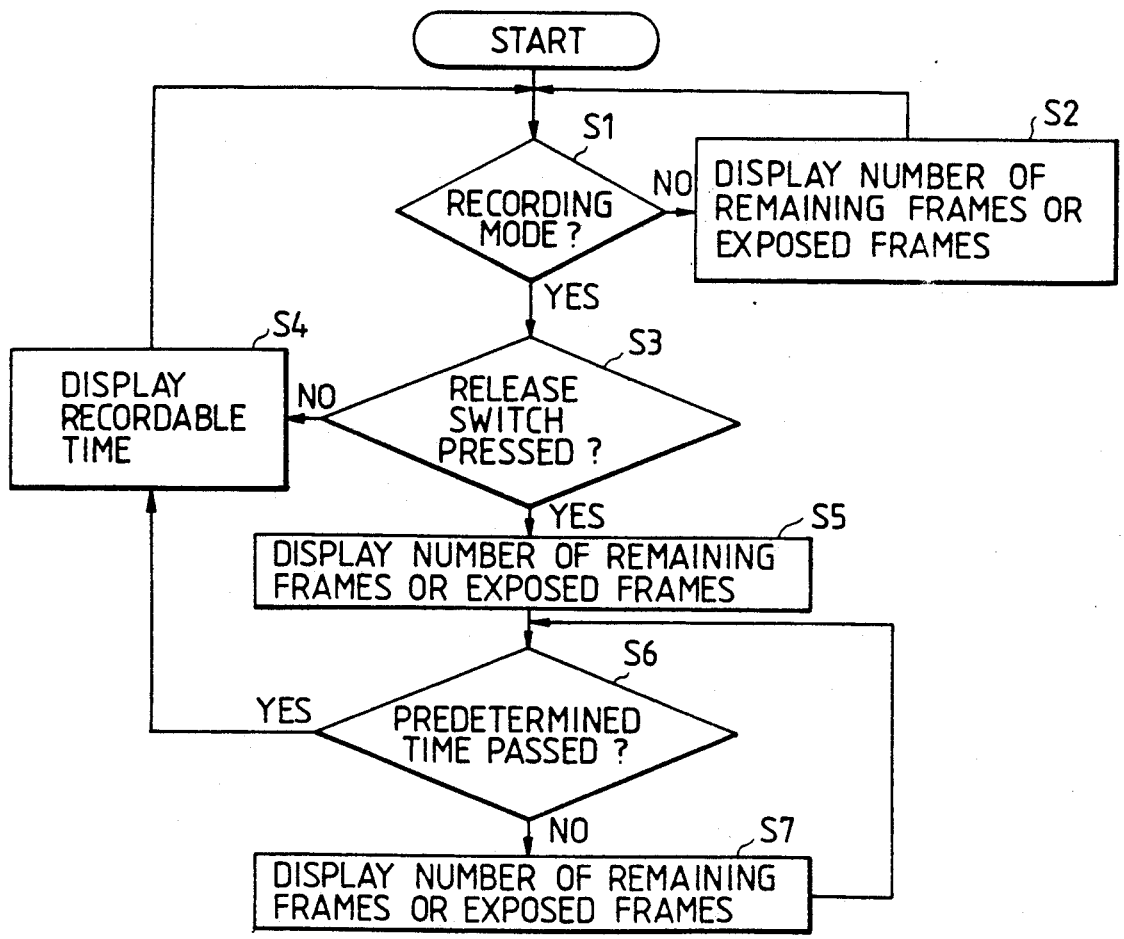
FIG. 19 is a flowchart of the display operation conducted by a CPU of FIG. 18.

FIG. 19 is a flowchart of the display operation made by the CPU 120.

In step S1, it is determined from a signal sent from the sound recording button 29 whether or not the still camera is in the sound recording mode. If the camera is not in the sound recording mode, the number of remaining frames or the number of photographed frames is displayed in step S2. Thereafter, the process returns to step S1. If it is determined in step S1 that the still camera is in the sound recording mode, it is determined in step S3 whether or not the release button 26 is pressed. If not, the recordable time is displayed in step S4. Thereafter, the process returns to step S1. If it is determined in step S3 that the release button 26 is pressed, the number of remaining frames or the number of photographed frames is displayed in step S5. Display continues until a predetermined time has elapsed. If it is determined in step S6 that the predetermined time has elapsed, the recordable time is displayed in step S4. Thereafter, the process returns to step S1.

As will be understood from the foregoing description, it is possible according to the present invention to check the number of remaining frames and the sound recordable time during the operation. Furthermore, it is possible to facilitate photographing and sound recording by conducting them in accordance with the preset number of frames to be photographed and the preset recording time.

We claim:

1. An electronic still camera comprising:
   an imaging device for receiving light from an object and outputting an analog image signal;
   a first A/D conversion means for converting the analog image signal obtained by said imaging device into a digital image signal;
   a microphone for picking up sound and outputting an analog audio signal;
   a second A/D conversion means for converting the analog audio signal obtained by said microphone into a digital audio signal;
   a control means for recording the digital image signal and the digital audio signal onto a memory card which is removably mounted on a camera body; and
   a semiconductor line memory for storing said digital audio signal.

2. An electronic still camera according to claim 1, wherein said semiconductor line memory is of the dual port type.

3. An electronic still camera according to claim 1, wherein said control means changes a frequency of a reading-out clock supplied to said semiconductor line memory between when the digital audio signal alone is recorded on said memory card and when both the digital audio signal and the digital image signal are recorded on the memory card.

4. An electronic still camera according to claim 1, wherein said control means starts writing of the digital audio signal in said semiconductor line memory at the time recording of the digital image signal on the memory card is started, and continues it until a writing address of said semiconductor line memory coincides with a reading-out address thereof after recording of the digital image signal onto said memory card has been completed, said control means suspending writing of the digital audio signal on said semiconductor line memory at the time other than the above-described time.

5. An electronic still camera comprising:
   an imaging device for receiving light from an object and outputting an analog image signal;
   a first A/D conversion means for converting the analog image signal obtained by said imaging device into a digital image signal;
   a microphone for picking up sound and outputting an analog audio signal;
   a second A/D conversion means for converting the analog audio signal obtained by said microphone into a digital audio signal;
   a control means for recording the digital image signal and the digital audio signal onto a memory card which is removably mounted on a camera body; and
   a display device for displaying a number of photographed frame or a number of remaining frame, as well as the remaining sound recordable time.

6. An electronic still camera according to claim 5, wherein the display of said display device can be changed over between the number of remaining frames and the remaining sound recordable time, said display device normally displaying either of the number of remaining frames or the remaining sound recordable time.

7. An electronic still camera according to claim 5, further comprising a means of changing the remaining sound recordable time at the time the number of remaining frame is changed to a given number, said display device displaying both the number of remaining frames and the remaining sound recordable time at the same time.

8. An electronic still camera according to claim 5, wherein only the remaining sound recording time among the displays made by said display device is separately displayed on the front side of a camera body or at a position where it can be monitored by a person who is photographed.

* * * * *